(No Model.) 2 Sheets—Sheet 1.

S. FOX.
APPARATUS FOR THE MANUFACTURE OF ARTICLES FROM METALLIC PLATES.

No. 418,869. Patented Jan. 7, 1890.

(No Model.) 2 Sheets—Sheet 2.
S. FOX.
APPARATUS FOR THE MANUFACTURE OF ARTICLES FROM METALLIC PLATES.
No. 418,869. Patented Jan. 7, 1890.
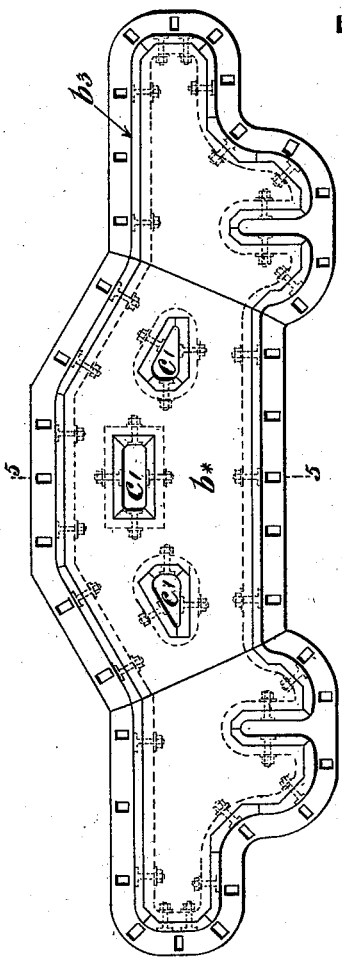
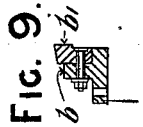
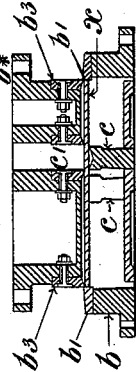
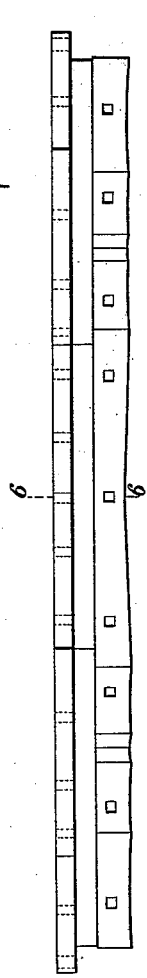
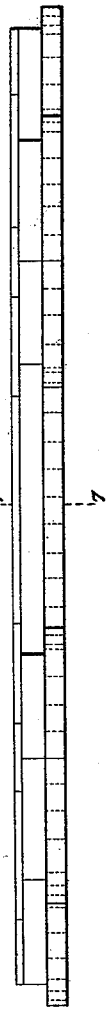
Witnesses
Thos. E. Craven. Fel. Inst. P.A.
24 Victoria Chambers. Leeds
William Sadler
31 Livingstone Terrace, Leeds.
Inventor.
Samson Fox
per Foster & Freeman
Attorneys
N. PETERS, Photo-Lithographer, Washington, D.C.

UNITED STATES PATENT OFFICE.

SAMSON FOX, OF HARROGATE, COUNTY OF YORK, ENGLAND.

APPARATUS FOR THE MANUFACTURE OF ARTICLES FROM METALLIC PLATES.

SPECIFICATION forming part of Letters Patent No. 418,869, dated January 7, 1890.

Application filed May 7, 1889. Serial No. 309,879. (No model.)

*To all whom it may concern:*

Be it known that I, SAMSON FOX, a subject of the Queen of Great Britain and Ireland, residing at Harrogate, in the county of York, Kingdom of Great Britain and Ireland, have invented new and useful Improvements in Machinery or Apparatus for the Manufacture or Production of Certain Articles from Metallic Plates, of which the following is a specification.

In the specification of an application for Letters Patent bearing even date herewith, Serial No. 309,880, is described the manufacture or production at one operation, instead of by a series of operations, of certain articles such as in some cases are afterward to be used as or formed into frame-plates, horn-plates, axle-guards, bolster-beams, brake-beams, draw-beams, and other parts of rolling-stock, and other similar articles, (either with or without openings,) which it has heretofore been customary to produce in the rough by imparting the required shape to metallic plates by a series of operations in a manner that has rendered the work tedious, comparatively slow, costly, and unreliable as regards accuracy, especially where it has been desired to produce two or more articles exactly alike.

According to the said invention, as described in my other specification above mentioned, articles of the kind referred to above are produced by a kind of combined punching and shearing process at one operation by suitable male and female dies, each of which in some cases partakes of the nature of both punch and shear, being caused to approach each other, or one being caused to approach the other while the metallic plate to which a definite form is to be imparted is between them, (either in a hot or cold state,) and whether it be desired simply to give a definite external shape or configuration to the article produced or to also form holes or openings of definite shape through the same.

Now, my present invention has reference to a special construction of machinery or apparatus for use in the manufacture of articles of the kind referred to according to my said new or improved method or process.

Figure 1:
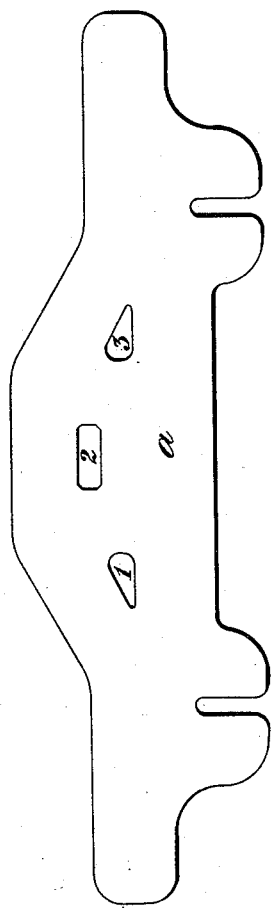

The form of the combined punching and shearing apparatus will depend upon the shape or configuration to be imparted to the metallic plate acted upon; but for the purpose of explaining the nature of my invention and the manner in which it may be conveniently carried into practical effect, I will describe, with reference to the annexed two sheets of illustrative drawings, the construction of an apparatus for manufacture or production (from a metallic plate) of a "wheel-piece" for a bogie-frame for rolling-stock. The shape of the wheel-piece is represented in Figure 1 of the drawings.

1, 2, and 3 represent holes or openings through the wheel-piece.

Figure 2:
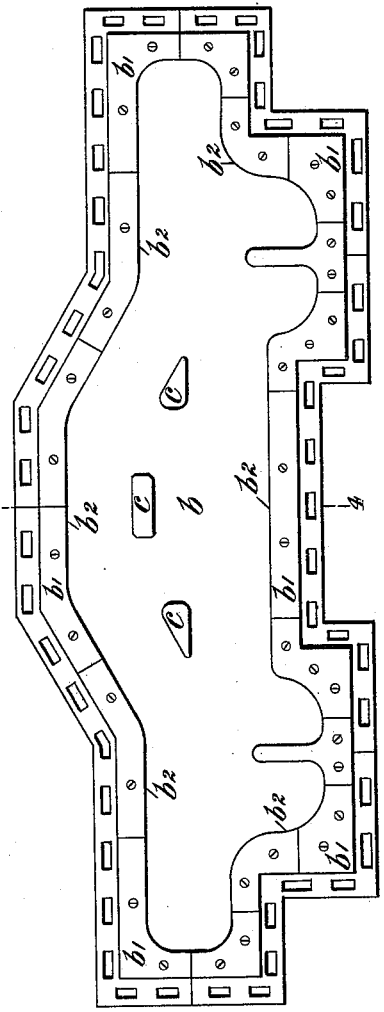

Figs. 2 to 6, inclusive, illustrate combined punching and shearing apparatus according to my present invention, Fig. 2 being a plan of an annular shear or a compound female die. $b$ is a frame. $b'$ are shear-blades fixed around it, their cutting-edges $b^2$ constituting the inner part of the die. The internal configuration of the die must correspond to the external form to be imparted to the plate operated upon—the form to be produced by the apparatus illustrated is that shown in Fig. 1. $c\ c\ c$ are punches placed in openings at the bottom of female die, (see Fig. 6,) or they may be placed in other receptacles suitable for holding them in position, their purpose being to form the perforations 1, 2, and 3 above mentioned. Fig. 3 is a plan or face view of the male die, which is compound of punch and dies, the punch-blades $b^3$ having an external configuration corresponding to the internal form of the above-described annular shear, (see Fig. 2,) while the dies $c'$ correspond to the shape of the punches $c\ c\ c$ contained within the said shear or female die, and consequently also to perforations required to be formed in the plates treated. Figs. 4 and 5 show in elevation the above-described parts. The combined parts indicated in Fig. 4 are to be attached to one part—say the stationary part—and the combined parts indicated in Fig. 5 to the other—say the movable—part of any suitable hydraulic or other actuating or pressing machine, so that they may be caused to approach each other when a plate (hot or cold) is between them, and at one operation to cut such plate to the desired form—Fig. 1, for example. Fig. 6 is a transverse sectional elevation at the lines 4 4, 5 5, 6 6, and 7 7 of the above-described compound punching and shearing apparatus, the parts being in the relative positions they would occupy when having cut a plate $x$ to the required external form and just about to make the perforations 1, 2, and 3 therethrough.

The dies $c'$, corresponding to the perforations 1, 2, and 3, are shown formed in sections; but I find it in some cases advantageous and economical to make the die $c'$ for each respective perforation in one piece (one of which is shown in Fig. 7 in plan, and sectional elevation Fig. 8) by casting it in hard steel, and then grinding out internally and externally on the face thereof to a proper shearing angle. The punch-blades $b^3$ and shear-blades $b'$, I also cast in hard steel, as shown in cross-section Fig. 8, and in Fig. 9. Such dies are suitably mounted upon and in metallic beds or frames, as shown, and are also ground externally and internally, as in the case of the annular dies $c'$.

It is to be understood that the shapes of the punches $c$ $c$ $c$ and dies $c'$ $c'$ $c'$ will depend upon the forms of holes or perforations required to be produced, and these punches and dies will be dispensed with when the plate is not to be perforated; also, it is to be noted that plates cut to any desired form in accordance with my invention may be subjected to other operations—such, for example, as flanging—as may be required to adapt them to the particular purposes for which they are intended.

I reserve to myself the right to vary the forms of the parts as may appear necessary or desirable according to the forms of the articles to be produced by my apparatus; but I make no claim to the process to be employed, as that is fully set forth and claimed in my aforesaid application, Serial No. 309,880; but

I claim—

1. In a combined shear and punch, the combination of a female die having external shear-blades and central punches secured thereto, and a male die having external shear-blades secured thereto, and having central openings corresponding with the punches of the female die, whereby the material to be operated upon is cut and punched by the movement of said dies toward each other, substantially as described.

2. In a cutting or shearing machine, the combination, with a plate or frame, of a series of shear-blades secured upon the outer portion thereof, the inner edges of which are cutting-edges and conform to the outline of the desired article, and another plate or frame and a series of punch-blades secured to its outer edge, the outer faces of which conform to the outline of the desired article and are adapted to pass within the shear-blades upon the first-mentioned plate, substantially as described.

3. In a cutting or shearing machine, the combination, with the two plates or frames, each having a shoulder upon its exterior portion, of punch-blades secured to one of said plates and shear-blades secured to the other, said shear-blades being cast in hard steel and ground externally and internally and engaging with or bearing against said shoulders, substantially as described.

Leeds, April 25, 1889.

SAMSON FOX.

In presence of—
THOS. E. CRAVEN,
WILLIAM SADLER,
*Both of Leeds.*